(12) United States Patent
Field et al.

(10) Patent No.: US 7,757,281 B2
(45) Date of Patent: *Jul. 13, 2010

(54) PRIVILEGE RESTRICTION ENFORCEMENT IN A DISTRIBUTED SYSTEM

(75) Inventors: Scott A. Field, Redmond, WA (US); Liqiang Zhu, Kirkland, WA (US); Peter T. Brundrett, Seattle, WA (US); Paul J. Leach, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

This patent is subject to a terminal disclaimer.

(21) Appl. No.: 11/450,597

(22) Filed: Jun. 9, 2006

(65) Prior Publication Data

US 2008/0022368 A1      Jan. 24, 2008

(51) Int. Cl.
*G06F 7/04*      (2006.01)

(52) U.S. Cl. .............................. 726/17; 726/18; 726/19; 713/166

(58) Field of Classification Search ....................... None
See application file for complete search history.

(56) References Cited

U.S. PATENT DOCUMENTS 6,161,139 A * 12/2000 Win et al. ..................... 709/225
7,290,129 B2 * 10/2007 Chebolu et al. .............. 713/150

* cited by examiner

*Primary Examiner*—Pramila Parthasarathy
(74) *Attorney, Agent, or Firm*—Woodcock Washburn LLP

(57) ABSTRACT

Remote administrative privileges in a distributed system are disabled by default. To administer a remote system, express action is taken to elevate a user status to obtain remote administrative privileges. When local and remote systems communicate, information pertaining to the status of the logged on user is included in the communications. If the user wishes to legitimately administer a remote system, the user provides an explicit request. The request is processed. If the user is configured as an administrator of the remote system and the request contains an indication that the user's administrative status has been elevated, an authorization token is generated. The authorization token is utilized by the remote system to allow the user to administer the remote system.

16 Claims, 4 Drawing Sheets

PRIVILEGE RESTRICTION ENFORCEMENT IN A DISTRIBUTED SYSTEM

TECHNICAL FIELD

The technical field generally is related to computer systems and more specifically to enforcement of privileges on distributed systems.

BACKGROUND

In current distributed systems, effortless connectivity and seamless logon are expected. This ease of use, however, can pose problems related to security. For example, if malicious code, such as a virus, has entered one system on the distributed system, it is trivial for that code to propagate, utilizing the authentication credentials of the user, to other systems on the distributed system. This is due, in part, to users being granted remote administrative privileges when logging on to a system on the distributed system. In this situation, the malicious code can propagate and act as an administrator on any remote system on which the user has administrative privileges. This can lead to the malicious code gaining complete access to the remote system.

SUMMARY

This Summary is provided to introduce a selection of concepts in a simplified form that are further described below in the Detailed Description Of The Illustrative Embodiments. This Summary is not intended to identify key features or essential features of the claimed subject matter, nor is it intended to be used to limit the scope of the claimed subject matter.

In an example distributed system, remote administrative privileges are disabled by default. When a user logs on to a system in the distributed system, the user is not automatically granted administrative privileges for remote systems in the distributed system. Thus, even though the user may have been granted local administrative privileges, the user is not automatically granted remote administrative privileges. To administer a remote system, the user provides an express indication of the requested elevation in status (a transition from unauthorized to have administrative privileges to authorized to have administrative privileges). The request, embedded in an authentication message, is received and processed by the remote system. If the remote system determines that the user can be granted the requested administrative privileges, an authentication token is generated indicating the administrative privilege, or privileges, associated with the user for that remote system. The authentication token is utilized by the remote system to allow the user to administer the remote system.

BRIEF DESCRIPTION OF THE DRAWINGS

The foregoing summary, as well as the following detailed description, is better understood when read in conjunction with the appended drawings. For the purpose of illustrating privilege restriction enforcement in a distributed system, there is shown in the drawings exemplary constructions thereof; however, privilege restriction enforcement in a distributed system is not limited to the specific methods and instrumentalities disclosed.

DETAILED DESCRIPTION OF ILLUSTRATIVE EMBODIMENTS

Figure 1:
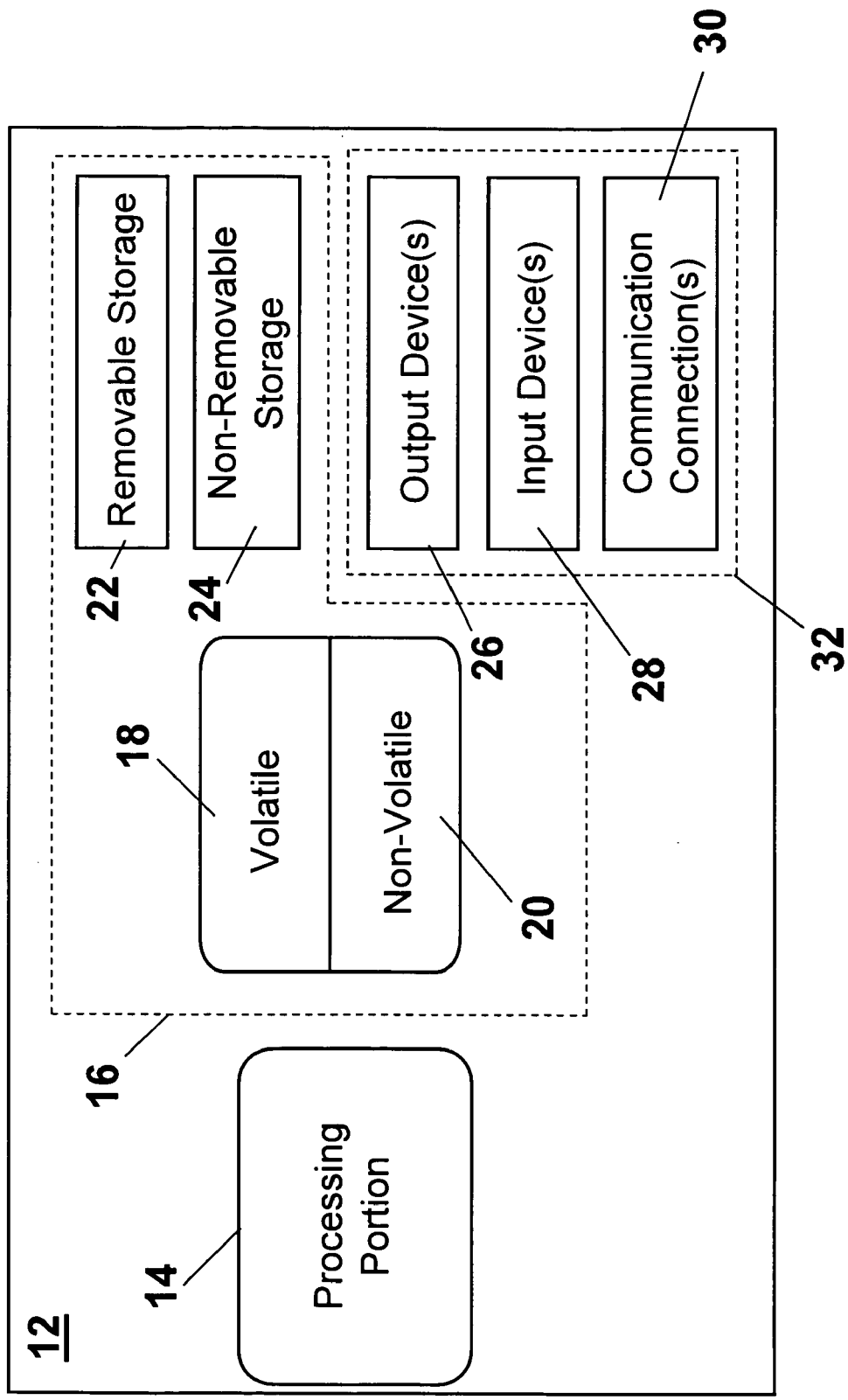
FIG. 1 is a diagram of an example computing device for enforcing privilege restrictions in a distributed system.

FIG. 1 is a diagram of an example computing device 12 for enforcing privilege restrictions in a distributed system. Computing device 12 comprises a processing portion 14, a memory portion 16, and an input/output portion 32. The processing portion 14, memory portion 16, and input/output portion 32 are coupled together (coupling not shown in FIG. 1) to allow communications therebetween. The computing device 12 is representative of a system in the distributed system. Thus, a local system in the distributed system can comprise the computing device 12 and/or a remote system in the distributed system can comprise the computing device 12. The processing portion 14 is capable of performing all appropriate functions for enforcing privilege restrictions in a distributed system. The processing portion 14 is capable of generating a request to administer a local system in a distributed system. The processing portion 14 is capable of generating an authentication payload, included in the request and indicative of the administrative privileges being requested. The processing portion 14 is capable of determining if administrative privileges associated with the request are authorized. The processing portion 14 also is capable of generating an authentication token indicative of authorized administrative privileges. The computing device 12 can utilize the authentication token to allow administration of the remote system.

The memory portion 16 is capable of storing any and all parameters associated with enforcing privilege restrictions in a distributed system. Input/output portion 32 is capable of providing and/or receiving the information associated with enforcing privilege restrictions in a distributed system. For example, input/output portion 32 is capable of providing and/or receiving the request to administer the remote system, and capable of providing and/or receiving information associated with communications between systems in the distributed system.

The computing device 12 can be implemented as a client processor and/or a server processor. Depending upon the exact configuration and type of processor, memory portion 16 can be volatile (such as RAM) 18, non-volatile (such as ROM, flash memory, etc.) 20, or a combination thereof. Computing device 12 can have additional features/functionality. For example, computing device 12 can include additional storage (removable storage 22 and/or non-removable storage 24) including, but not limited to, magnetic or optical disks, tape, flash, smart cards or a combination thereof. Computer storage media, such as memory portion 16, 18, 20, 22, and 24, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by computing device 12. Any such computer storage media can be part of computing device 12.

The computing device 12 can also contain communications connection(s) 30 that allow the computing device 12 to communicate with other devices. Communications connection(s) 30 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. Computing device 12 also can have input device(s) 28 such as keyboard, mouse, pen, voice input device, touch input device, etc. Output device(s) 26 such as a display, speakers, printer, etc. also can be included.

Figure 2:
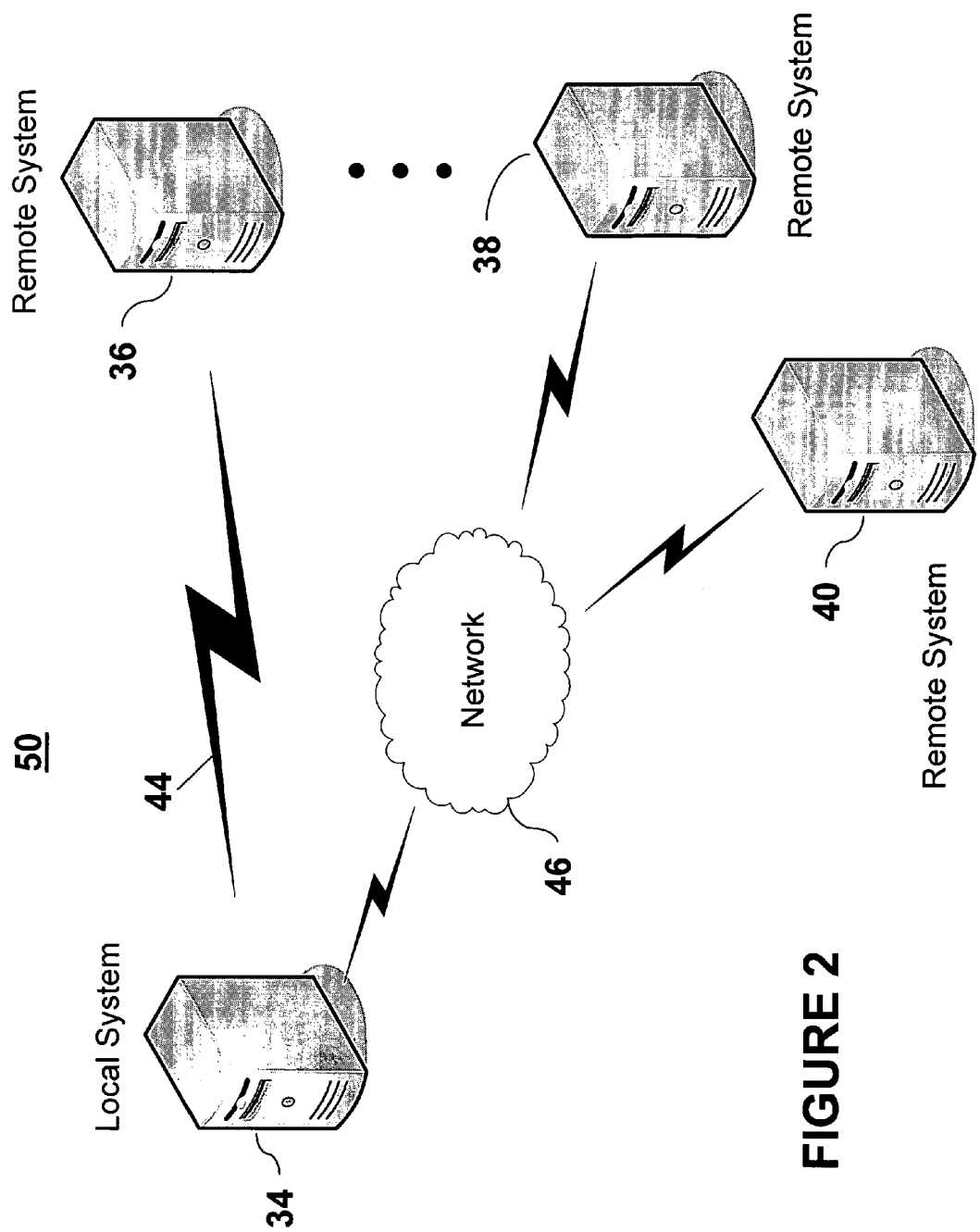
FIG. 2 is an example distributed system.

FIG. 2 is an example distributed system 50 in which privilege restrictions are enforceable. The distributed system 50 comprises multiple systems. The multiple systems of the distributed system 50 are represented by a local system 34 and remote systems 36, 38, 40. The distributed system 50 can comprise any number of local and remote systems. From a user's perspective, there are typically one local system and many remote systems. The configuration depicted as distributed system 50 is not meant to be limiting to a specific configuration. Rather, the distributed system 50 is representative of any appropriate configuration of systems. For example, two remote systems 38 and 40, are shown coupled to the local system by a network 46, and a single remote system 40 is shown coupled to the local system 34 via an interface 44. It is to be understood, however, that any appropriate number of remote systems can be coupled to a local system by any combination of interfaces and networks.

Each system of the distributed system 50 can comprise a computing device 12. Each of the systems 34, 36, 38, and 40, can be implemented in a single computing device (e.g., computing device 12 of FIG. 1), or multiple computing devices. Multiple computing devices can be distributed or centrally located. Multiple computing devices can communicate wirelessly, via hard wire, or a combination thereof. Each portion of each system 34, 36, 38, and 40, can be implemented via multiple distributed computing devices, nodes and/or databases. The interfaces (interface 44 and network 46) used by the systems 34, 36, 38, and 40, to communicate to communicate therebetween, can comprise any appropriate interface, such a wireless interface, a wired interface, or a combination thereof. Any of a wide variety of communications protocols can be utilized, including both public and proprietary protocols. Examples protocols include TCP/IP, IPX/SPX, and NetBEUI. Communications between the systems 34, 36, 38, and 40 can be via a network or networks, such as the network 46. Each network can include a wired network or a direct-wired connection. Networks can comprise public portions (e.g., the Internet) as well as private portions (e.g., a residential Local Area Network (LAN)), or a combination thereof. Networks can be implemented using any one or more of a wide variety of conventional communications media including both wired and wireless media such as acoustic, RF, infrared and other wireless media.

The distributed system 50 is representative of many system configurations. For example, the distributed system 50 can represent a distributed system in a home environment. In a home distributed system, users tend to have the same account on every system in the distributed system. That account typically has administrative permissions on each system. Each system comprises a single computing device. User accounts are created on multiple computing devices, and, for convenience, each user account and password is set to be the same on each computing device. A user may be an administrator on one machine and not another. For example, a teenager may be an administrator of the computing device used primarily for game playing or web surfing, and not an administrator on the computing device that her parents use for home finance. The parents are assumed to be the administrator on each computing devices that has an account.

In another example home distributed system user accounts can be automatically replicated for multiple computing devices in the home environment. A parent who is an administrator on one computing device has an administrator account on all computing devices in the home distributed system.

Another example distributed system represented by the distributed system 50 is a small business distributed system. Typically, one or two individuals are administrators of a domain of systems, and all other users are standard users (having no administrative privileges on the domain). A small number of individuals may be administrator on their own computing devices (such as a desktop), but are not administrator on other computing devices or systems.

Yet another example distributed system represented by the distributed system 50 is an enterprise distributed system. An enterprise distributed system can comprise many domains and users can have privileges based on their roles. For example, a small group of users can be enterprise administrator having full administrative privileges on all systems in the distributed system. There may be several domain administrators, each having administrative privileges on the systems within a respective domain. The majority of users are standard users having administrative privileges on their own computing devices (e.g., desktop), and no administrative privileges on any other computing device.

Figure 3:
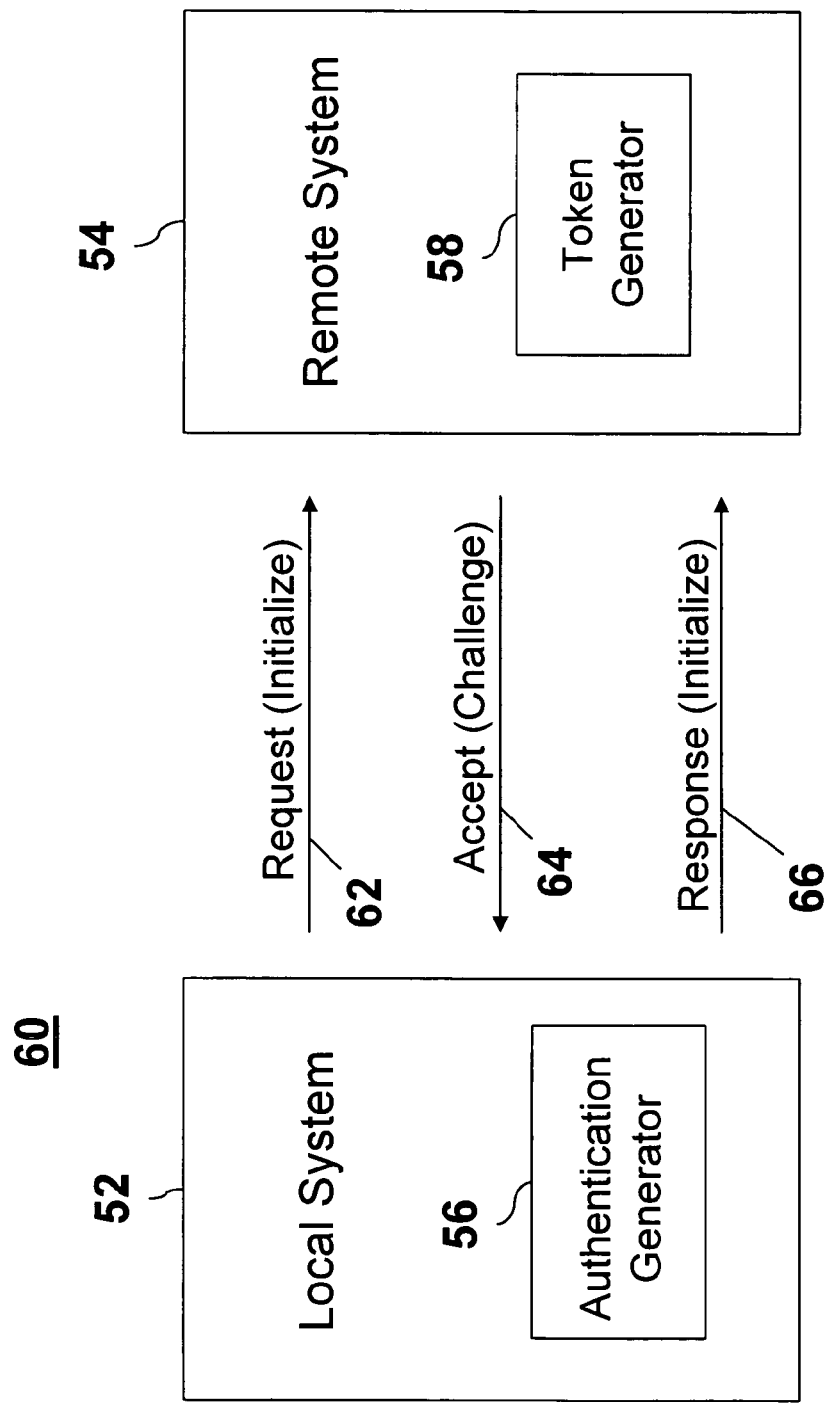
FIG. 3 is a more detailed depiction of an example distributed system.

The above examples of distributed systems represented by the distributed system 50 are a small number of the types of systems that can be detrimentally affected by malicious code, or the like, propagating to remote systems of a distributed system on which the user has remote administrative privileges. FIG. 3 is a more detailed depiction of an example distributed system 60, illustrating privilege restriction enforcement. Only two systems are shown in the distributed system 60 for the sake of simplicity. The distributed system 60 comprises a local system 52 and a remote system 54. When a user logs on to the local system 52, the user is not automatically granted administrative privileges of the remote system 54. Dependent upon the system, the user may or may not automatically be granted administrative privileges of the local system 52. To administer the remote system 54, the user takes express action. To initialize this action, the user sends a request 62 to administer the remote system 54. More generally, the user sends a respective request 62 for each remote system intended to be administered. As shown in FIG. 3, the request is sent to the remote system 54. In another example embodiment, however, the request can be sent to another system that receives and processes the request 62, and facilitates the configuration of the remote system 54 to permit the user to administer the remote system 54.

In an example embodiment, the request 62 can include a restriction limiting the administrative privileges granted to the local system 52. This restriction can be imposed by the local system 52 and/or the user. The restriction can be later honored by the remote system 54, independent of the policy decision making process on the remote system 54. For example, the local system 52 can say it is permissible to be an administrator of the remote system 54 if the authentication attempt (request 62) originates from a process that is launched from a separate secure desktop. The remote system 54 could check which desktop the requesting client is running on and indicate this in the authentication request blob, which later gets honored by the remote system 54.

The request 62 comprises at least one administrative privilege for administering the remote system 54. The user may request all or a subset of the administrative privileges associated with the remote system 54. For example, the user may request administrative privileges associated with capabilities and/or groups. Example capabilities include the ability to debug programs, backup files, restore files, and load device drivers Example groups include Local Administrators, Domain Administrators, Server Operator, and Backup Operator. The authentication generator 56 generates the authentication payload to be included in the request 62. The authentication payload is indicative of the administrative privileges, capabilities, groups, or a combination thereof, being requested to be applied on the remote system 54.

The request 62 can be provided over a non-secure or secure channel. For example, to be provided over a secure channel, the request can be encrypted and/or authenticated, the request 62 can be provided over a separate physical interface, or a combination thereof. Subsequent to receiving the request 62, the system receiving the request (e.g., remote system 54) accepts (64) the request 62. The acceptance 64 and the corresponding response 66 can be in accordance with any appropriate protocol. In an example embodiment, the acceptance 64 and response 66 are in accordance with the security support provider interface (SSPI) protocol. For example, the acceptance 64 can comprise a challenge and the response 66 can comprise a response to the challenge. As is known in the art, prior to two entities communicating, in accordance with various protocols, one entity can challenge another entity. The challenged entity provides a response that is determined in accordance with an algorithm that is known to both entities. For example, the response can comprise a random number generated from a seed determined in accordance with the commonly known algorithm.

Once the requirements of the SSPI, or the like, are satisfied, the remote system 54 determines if the requested administrative privilege (or privileges) is authorized. If the administrative privilege is authorized, the request is granted and the token generator 58 generates an authentication token allowing the user to administer the remote system 54 in accordance with the authorized administrative privilege. The authentication token is used by the remote system 54 to allow the user to remotely administer the remote system 54.

If the user wants to remotely administer another remote system, the user takes express action to administer the other remote system. Thus, for example, acquiring administrative privileges to remotely administer the remote system 54 does not grant the user remote administrative privileges for other remote systems. If the user logs off the remote system 54, the remote administrative privileges associated with the remote system 54 for that user are discontinued. Thus, the user would have to take the express action, as described above, to request remote administrative privileges of the remote system 54.

Figure 4:
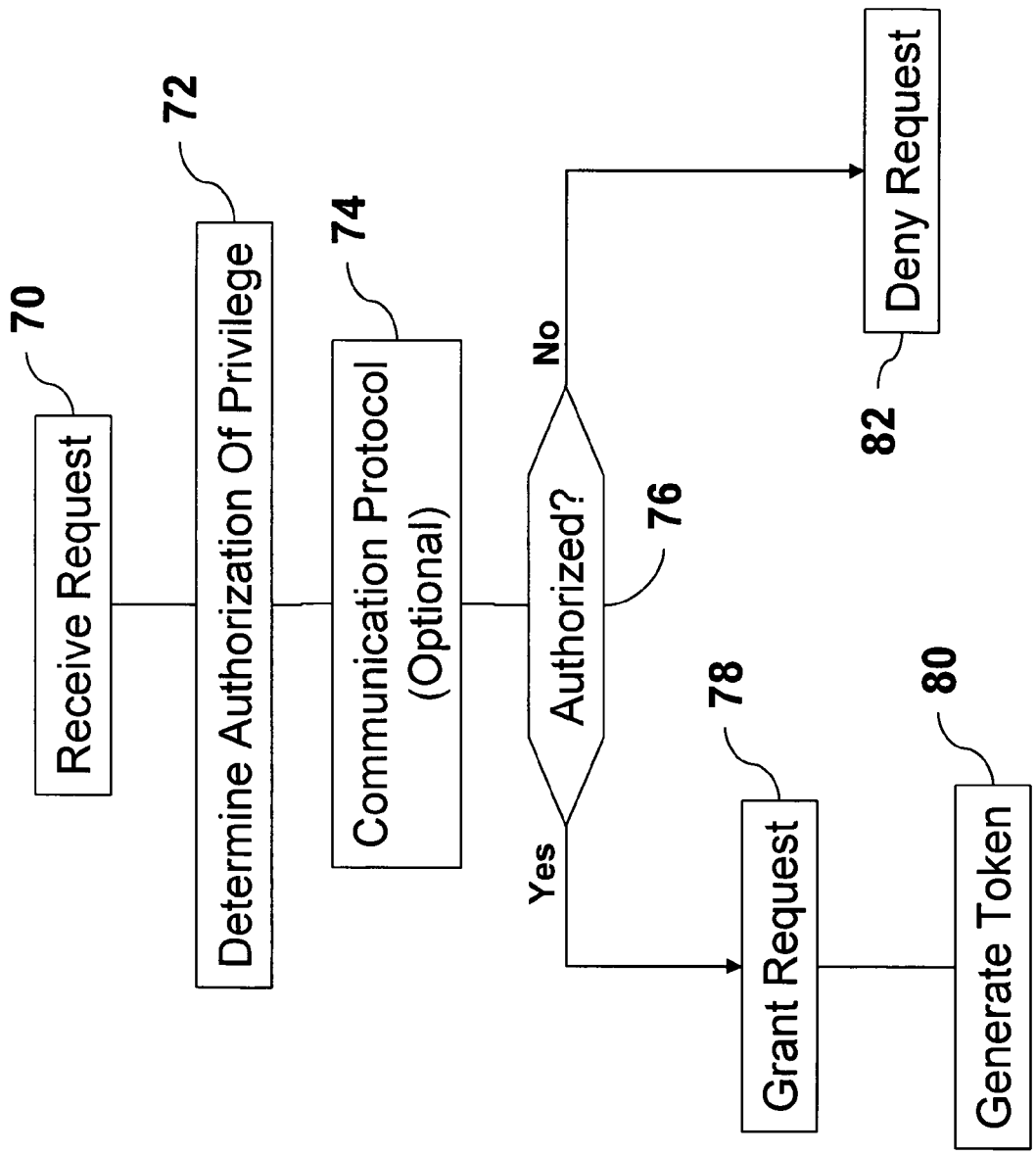
FIG. 4 is a flow diagram of an example process for enforcing privilege restrictions in a distributed system.

FIG. 4 is a flow diagram of an example process for enforcing an administrative privilege in a distributed system. The request to administer a remote system is received at step 70. This request can be received by the remote system to be administered, by another designated system, or a combination thereof. As described above, the request comprises at least one administrative privilege. At step 72, it is determined if the requested privilege(s) is authorized. Optional communications procedures are conducted at step 74 in accordance with an appropriate protocol (e.g., SSPI). If the privilege(s) is authorized (step 76) the request is granted at step 78 and an authentication token is generated at step 80. The token can include a restriction, or restrictions, such as the client imposed restriction described above. If the privilege(s) is not authorized (step 76), the request is denied at step 82.

Privilege restriction on distributed systems as described herein mitigates the detrimental effects of malicious software (malware) operating with administrative privileges during authenticated local and/or remote network operations. By default, remote administrative capabilities are disabled. When local and remote systems communicate, information pertaining to the status of the logged on user is included in the communications. This information will comprise an indication of the administrative status (e.g., elevated or NOT elevated) of the user with respect to a particular local system. This status is carried in the distributed system authentication payload. If the user wishes to legitimately administer a remote system, the user provides explicit consent (request). Examples of providing consent include running an administrative application on a separate visible desktop surface, or through a secure-attention-sequence such as the CTRL-ALT-DEL key sequence. The request containing the authentication payload is processed and an authentication token is generated (if privileges are authorized). Administrative capabilities in the token will not be present unless two things are true: the user is configured as an administrator, and the authentication payload contains an indicator that administrative elevation is authorized.

The various techniques described herein can be implemented in connection with hardware or software or, where appropriate, with a combination of both. Thus, the methods and apparatuses for enforcing privilege restrictions in a distributed system or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for enforcing privilege restrictions in a distributed system.

The program(s) can be implemented in assembly or machine language, if desired. In any case, the language can be a compiled or interpreted language, and combined with hardware implementations. The methods and apparatuses for enforcing privilege restrictions in a distributed system also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for enforcing privilege restrictions in a distributed system. When implemented on a general-purpose processor, the program code combines with the processor to provide a unique apparatus that operates to invoke the functionality of privilege restriction enforcement in a distributed system. Additionally, any storage techniques used in connection with enforcing privilege restrictions in a distributed system can invariably be a combination of hardware and software.

While privilege restriction enforcement in a distributed system has been described in connection with the example embodiments of the various figures, it is to be understood that other similar embodiments can be used or modifications and additions can be made to the described embodiments for performing the same functions enforcing privilege restrictions in a distributed system without deviating therefrom. Therefore, enforcing privilege restrictions in a distributed system as described herein should not be limited to any single embodiment, but rather should be construed in breadth and scope in accordance with the appended claims.

What is claimed is:

1. A processor-implemented method for enforcing an administrative privilege in a distributed system, said method comprising:
   receiving, from an entity previously having at least one administrative privilege, an administrative request to administer a remote system in the distributed system in accordance with the at least one administrative privilege;
   determining, via the processor, if the at least one administrative privilege is authorized;
   if the at least one administrative privilege is authorized:
     generating an authentication token indicative of the granted administrative privilege, the authentication token being utilizable by the remote system to permit administration of the remote system; and
     permitting administration of the remote system in accordance with the granted administrative privilege.

2. A method in accordance with claim 1, further comprising automatically granting no remote administrative privileges when logging onto the distributed system.

3. A method in accordance with claim 1, further comprising taking an express action to administer the remote system.

4. A method in accordance with claim 1, further comprising receiving the administrative request via one of a secure channel and a non-secure channel.

5. A method in accordance with claim 1, wherein the administrative request comprises a restriction to the at least one administrative privilege.

6. A computer-readable storage medium having computer-executable instructions stored thereon for enforcing an administrative privilege in a distributed system by:
   receiving, from an entity previously having at least one administrative privilege, an authentication payload comprising the at least one administrative privilege associated with a user and a remote system in the distributed system;
   determining if the at least one administrative privilege is authorized; and
   if the at least one administrative privilege is authorized, permitting administration of the remote system in accordance with the authorized at least one administrative privilege.

7. A computer-readable storage medium in accordance with claim 6, wherein a remote administrative privilege is not automatically granted upon logging on to the distributed system.

8. A computer-readable storage medium in accordance with claim 6, the computer-readable medium having further executable instructions for receiving the authentication payload via one of a secure channel and a non-secure channel.

9. A computer-readable storage medium in accordance with claim 6, the computer-readable medium having further executable instructions for generating an authentication token indicative of the authorized administrative privilege, wherein the authentication token is utilizable by the remote system to permit administration of the remote system.

10. A computer-readable storage medium in accordance with claim 6, the computer-readable medium having further executable instructions for permitting administration of the remote system in accordance with the authorized at least one administrative privilege.

11. A computer readable storage medium in accordance with claim 6, wherein the authentication payload comprises a restriction to the at least one administrative privilege.

12. A system for enforcing an administrative privilege, said system comprising:
    an input/output portion for:
      receiving, from an entity previously having at least one administrative privilege, an administrative request to administer the system in accordance with the at least one administrative privilege; and
    a processor portion for:
      determining if the at least one administrative privilege is authorized; and
      if the at least one administrative privilege is authorized, permitting administration of the system in accordance with the authorized at least one administrative privilege, wherein the system comprises a remote system in a distributed system, and an administrative privilege for administering the remote system is not automatically granted upon logging on to another system of the distributed system.

13. A system in accordance with claim 12, further comprising one of a secure channel and a non-secure channel for receiving the administrative request.

14. A system in accordance with claim 12, further comprising a token generator for generating an authentication token indicative of the authorized at least one administrative privilege, wherein the authentication token is utilizable by the system to permit administration of the system.

15. A system in accordance with claim 12, said processing portion further for permitting administration of the system in accordance with the authorized at least one administrative privilege.

16. A system in accordance with claim 12, wherein the administrative request comprises a restriction to the at least one administrative privilege.

* * * * *

UNITED STATES PATENT AND TRADEMARK OFFICE
CERTIFICATE OF CORRECTION

| | | |
|---|---|---|
| PATENT NO. | : 7,757,281 B2 | Page 1 of 1 |
| APPLICATION NO. | : 11/450597 | |
| DATED | : July 13, 2010 | |
| INVENTOR(S) | : Scott A. Field et al. | |

It is certified that error appears in the above-identified patent and that said Letters Patent is hereby corrected as shown below:

In column 8, line 17, in Claim 11, delete "computer readable" and insert
-- computer-readable --, therefor.

Signed and Sealed this

Fifteenth Day of February, 2011

David J. Kappos
*Director of the United States Patent and Trademark Office*